(12) United States Patent
Hoshino et al.

(10) Patent No.: US 7,170,749 B2
(45) Date of Patent: Jan. 30, 2007

(54) ELECTRICAL APPARATUS AND CONNECTOR HOLDER FOR ELECTRICAL APPARATUS

(75) Inventors: Tsutomu Hoshino, Otsuki (JP); Akira Sugiyama, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/103,376

(22) Filed: Apr. 11, 2005

(65) Prior Publication Data

US 2006/0227525 A1    Oct. 12, 2006

(51) Int. Cl.
*H05K 7/20* (2006.01)
*H01R 12/00* (2006.01)

(52) U.S. Cl. ......................................... 361/718; 439/65
(58) Field of Classification Search ........ 361/718–720, 361/731, 732, 759, 801; 439/65, 357, 358, 439/369
See application file for complete search history.

(56) References Cited

U.S. PATENT DOCUMENTS

| | | | | |
|---|---|---|---|---|
| 4,472,765 | A | * | 9/1984 | Hughes ........................ 361/791 |
| 5,031,073 | A | * | 7/1991 | Chang ........................ 361/778 |
| 5,264,986 | A | | 11/1993 | Ohgami et al. |
| 5,316,491 | A | | 5/1994 | Satou et al. |
| 5,402,309 | A | | 3/1995 | Ohgami et al. |
| 5,513,069 | A | | 4/1996 | Ohgami et al. |
| 5,526,227 | A | | 6/1996 | Satou et al. |
| 5,827,074 | A | * | 10/1998 | Gatti ........................... 439/61 |
| 6,030,248 | A | * | 2/2000 | Dancel et al. ............... 439/350 |
| 6,283,778 | B1 | * | 9/2001 | Kupnicki et al. ............ 439/260 |
| 6,411,520 | B1 | * | 6/2002 | Hauke et al. ................ 361/796 |
| 6,496,376 | B1 | * | 12/2002 | Plunkett et al. ............. 361/729 |
| 6,639,806 | B1 | * | 10/2003 | Chuang et al. .............. 361/748 |

FOREIGN PATENT DOCUMENTS

JP           6056719        3/1999

* cited by examiner

*Primary Examiner*—Dean A. Reichard
*Assistant Examiner*—Hung Nguyen
(74) *Attorney, Agent, or Firm*—Blakely Sokoloff Taylor & Zafman LLP

(57) ABSTRACT

An electric apparatus has a motherboard, a control board and daughter board in a case. A front wall of the case is configured to have an opening. The motherboard is placed far behind an opening formed by removing the front wall. The control board, daughter board and extension board are inserted into the case from the opening toward the motherboard. A first connector provided at insertion ends of the control board and extension board is connected to a first receptor mounted on the motherboard. A second connector provided at an insertion end of the daughter board is connected to a second receptor mounted on the extension board. A holder which prevents the second connector being extracted from the second receptor when the daughter board is pulled out from the case, is mounted on the extension board.

6 Claims, 4 Drawing Sheets

ELECTRICAL APPARATUS AND CONNECTOR HOLDER FOR ELECTRICAL APPARATUS

BACKGROUND OF THE INVENTION

1. Field of the Invention

The present invention relates to an electrical apparatus having a daughter board connected by a connector inserted perpendicularly toward a motherboard placed in a case.

2. Description of the Related Art

An electrical apparatus has a motherboard and a daughter board in a case. The front wall of the case configured to be opened. The motherboard is placed at a position far behind the front wall, parallel to the front wall. The motherboard has receptors on the board. The case has a slot that guides the daughter board perpendicularly to the motherboard, from an opening provided by removing the front wall to the motherboard.

The daughter board has connectors corresponding to the receptors at an edge of the bard. The daughter board is inserted into the slot from the opening side with the connectors set forth. The receptor mounted on the motherboard is of a hot-swap type that allows connection and disconnection in the state being powered.

In a communication apparatus, a daughter board has a socket to receive a communication cable at an edge opposite to a connector. An individual daughter board is prepared to meet a variety of recent communication systems. Various shapes of socket are available for a daughter board with a different communication system. A wiring format of each daughter board is available in two types, a telephone type and a local area network (LAN) type.

In the telephone wiring format, an outlet for a wiring socket is provided in a case, and a cable is connected and disconnected by opening a cover of the case. In the LAN wiring format, an outlet for a wiring socket is placed on a front wall of the case, and a cable is connected and disconnected from the front side of the case without removing the cover of the case. The telephone wiring format and LAN wiring format are conventionally used separately and arranged in different apparatus. However, as the number of products applicable to Internet protocol (IP) has been increased, it becomes necessary to use these wiring formats together in one apparatus. As an information processing speed becomes fast, it is also demanded to increase a communication speed.

Therefore, a communication apparatus is updated in its function by replacing a telephone type daughter board by a LAN type daughter board, or by replacing an existing daughter board by a daughter board applicable to a fast communication speed. In this case, the board size of a daughter board is different for each daughter board. In a LAN type daughter board, it may become necessary to insert an extension board between a connector of a daughter board and a receptor of a motherboard.

If a daughter board is held and pulled out toward the opening side of the case for replacing a daughter board provided with an extension board, the extension board may remain there. If the extension board remains, it is difficult to take out the extension board because the opening is narrow.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
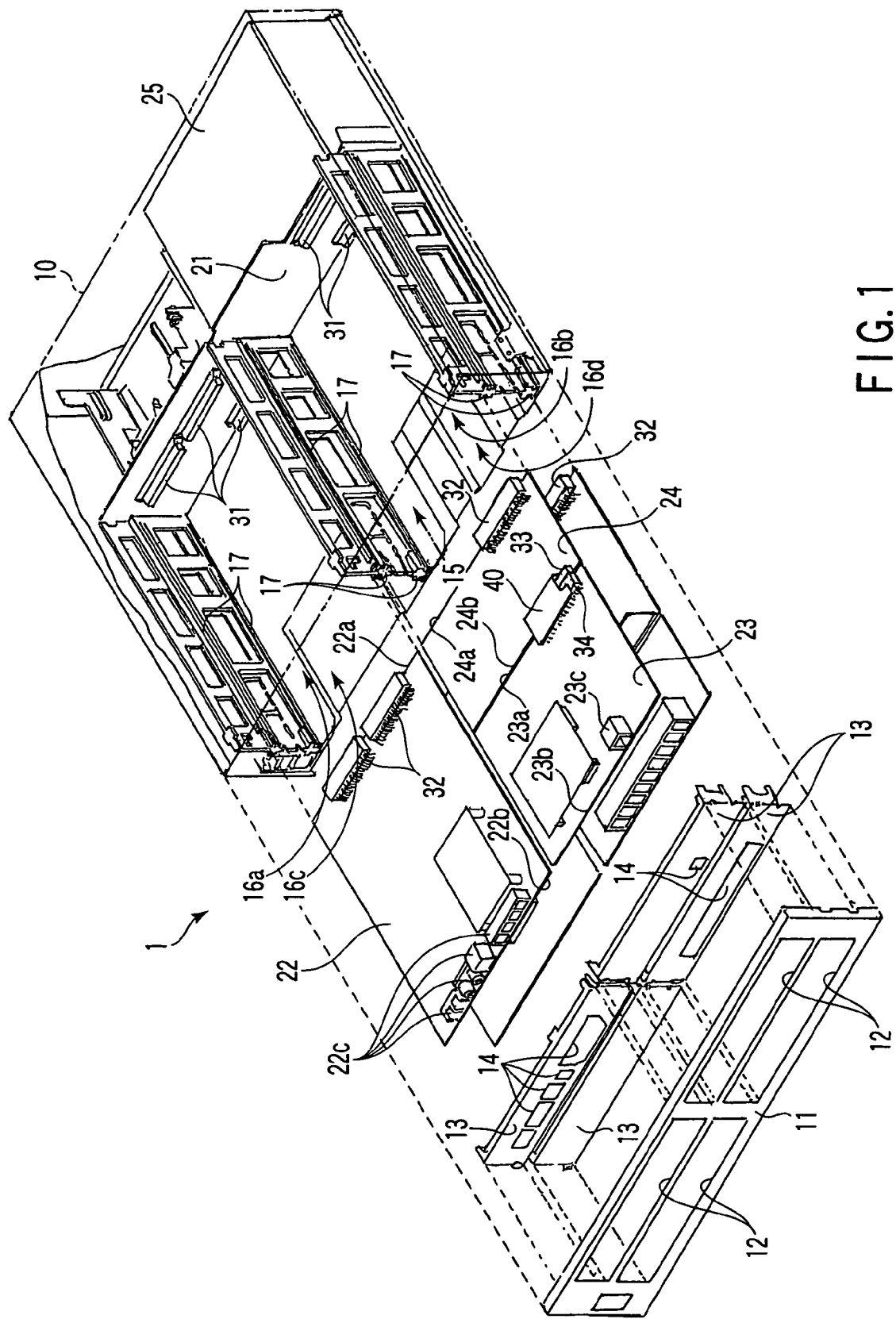
FIG. 1 is an exploded perspective view showing an electrical apparatus according to an embodiment of the present invention.

An electric apparatus and holder according to an embodiment of the present invention will be explained with reference to FIG. 1 to FIG. 7 taking a communication apparatus 1 as an example. The communication apparatus 1 has a case 10, a motherboard 21, a control board 22, at least one daughter board 23, and an extension board 24, as shown in FIG. 1. For the convenience of explanation, the side that a communication cable is inserted is defined as a front side or an opening side, and the side that a power supply unit 25 is mounted is defined as a rear side. Up/down is defined in the vertical direction in the state that a communication apparatus 1 is installed, and left/right is defined by viewing from the front side.

The case 10 forms a box-shaped outside shell, and a front wall 11 is detachably configured. The front wall 11 is formed as a lattice to make windows 12. A panel 13 is fit to each window 12 of the front wall 11 from the inside of the case 10. The panel 13 has a hole 14 to view a connection terminal mounted on the control board 22 or daughter board 23.

The motherboard 21 is placed at a position far behind an opening 15 formed by removing the front wall 11, with one surface faced to the opening 15. One surface of the motherboard 21 has a first receptor 31 of the number corresponding to the number of inserted control boards 22 and daughter boards 23.

The case 10 has a total of four insertion spaces 16a, 16b, 16c and 16d, two upper/lower steps and two left/right columns, in front of the motherboard 21. In this embodiment, as shown in FIG. 1, the control board 22 is inserted into the upper left side insertion space 16a, and the daughter board 23 and extension board 24 are inserted into the upper right side insertion space 16b. The other types of expansion boards are connected to the lower left/right insertion spaces 16c and 16d. A slot 17 is provided on both sides of the insertion spaces 16a, 16b, 16c and 16d between the front wall 11 and motherboard 21. The slot 17 provided perpendicularly to the motherboard 21 guides the sides of the control board 22 or daughter board 23 and extension board 24.

The control board 22, daughter board 23 and extension board 24 have the same width. The control board 22 has the length reaching the motherboard 21 from the front wall 11 of the case 10. The control board 22 has a first connector 32 corresponding to a first receptor 31 at an insertion edge 22*a* of the motherboard 21 side, and various connection terminals 22*c* placed side by side at a front edge 22*b* along the front wall 11. Particularly, the control board 22 has two first connectors 32, as shown in FIG. 1. Therefore, the first receptors 31 corresponding to these connectors are provided at a part the motherboard 21 to connect the control board 22.

The daughter board 23 and extension board 24 are guided by the slot 17, and inserted from the opening 15 toward the motherboard 21. The daughter board 23 is provided with many electronic components, and placed near the front wall 11. The extension board 24 is placed between the daughter board 23 and motherboard 21. The total length of the daughter board 23 and extension board 24 in the inserting direction is almost the same as the control board 22.

The extension board 24 has the first connector 32 at the edge 24*a* of the motherboard 21 side that is the insertion side edge, and a second receptor 33 at the edge 24*b* of the daughter board 23 side. The terminals provided in the second receptor 33 are conducted to the terminals provided in the first connector 32. The daughter board 23 has a second connector 34 corresponding to the second receptor 33 at the edge 23*a* of the extension board 24 side.

The daughter board 23 is inserted into the opening 15 together with the extension board 24, in the state that the second receptor 33 is connected to the second connector 34. When the first connector 32 of the extension board 24 is connected to the first receptor 31 of the motherboard 21, the daughter board 23 and motherboard 21 are conducted. The daughter board 23 is controlled by the control board 22 through the motherboard 21.

Figure 2:
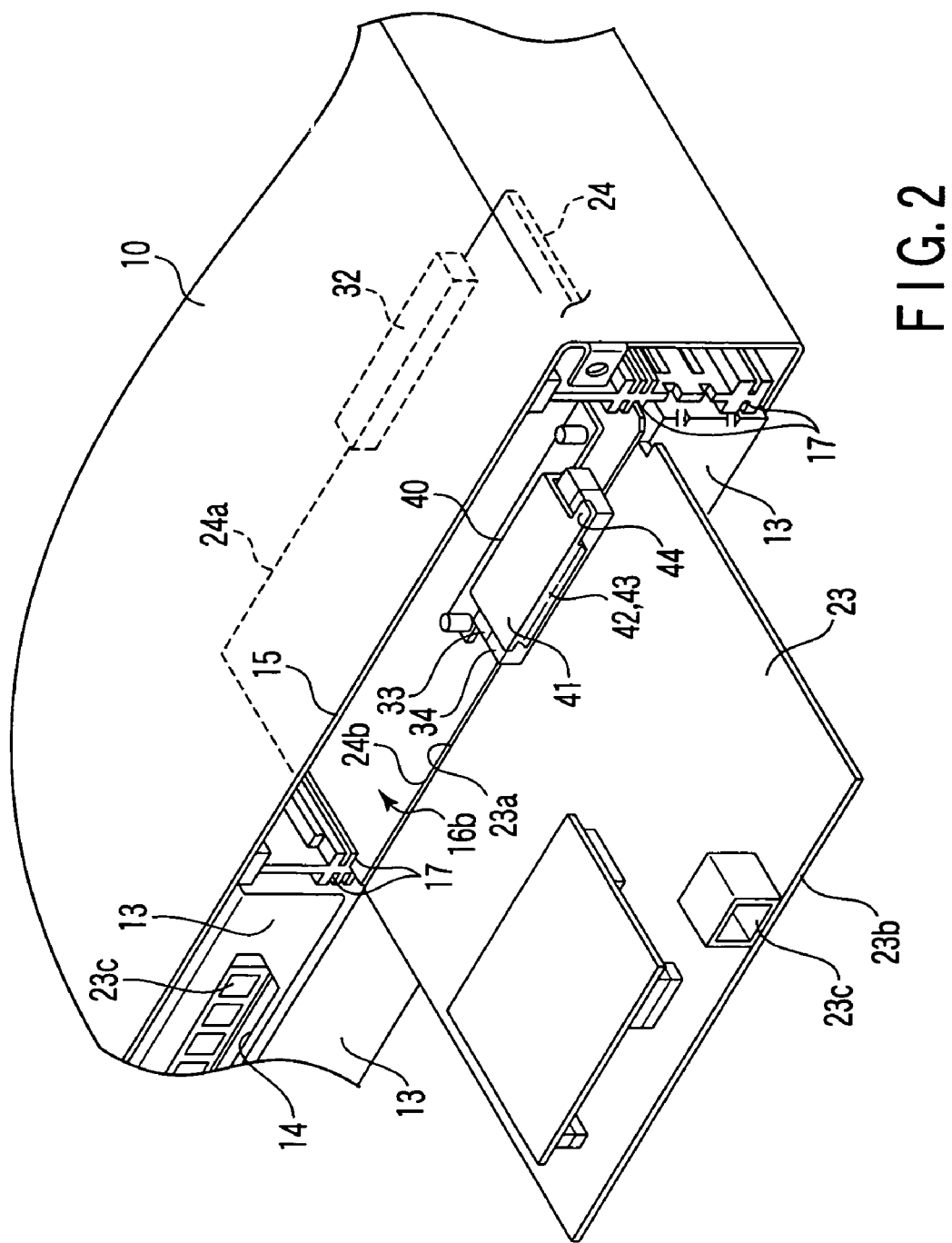
FIG. 2 is a perspective view of the electrical apparatus shown in FIG. 1, with a front part removed and daughter board pulled out.
Figure 3:
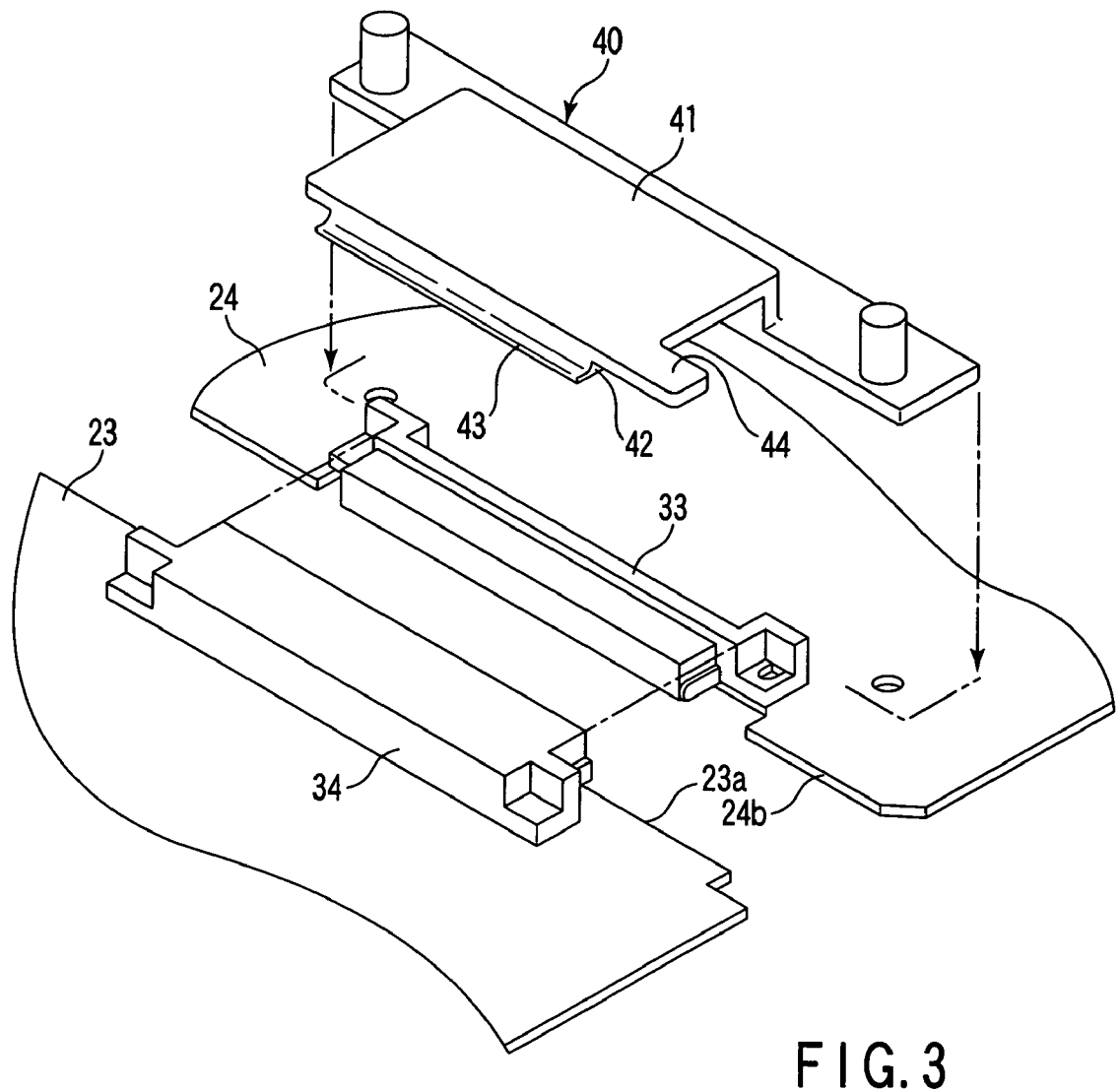
FIG. 3 is an exploded perspective view of a connecting part between the daughter board and extension board shown in FIG. 2.
Figure 4:
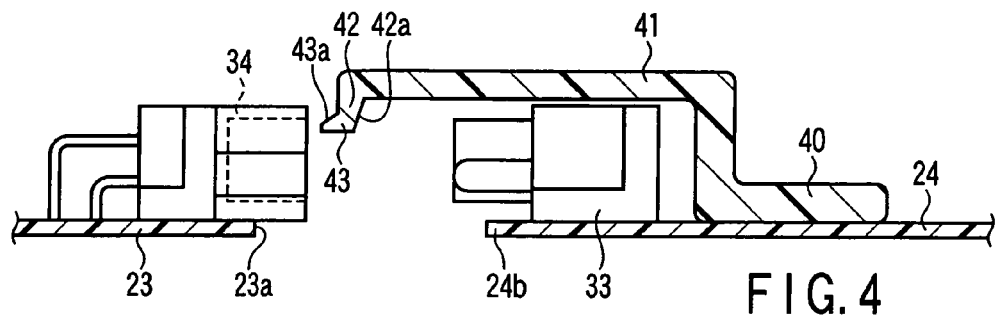
FIG. 4 is a sectional view of a state in which the connector of the daughter board and the receptor of the extension board, shown in FIG. 3, are separated.
Figure 6:
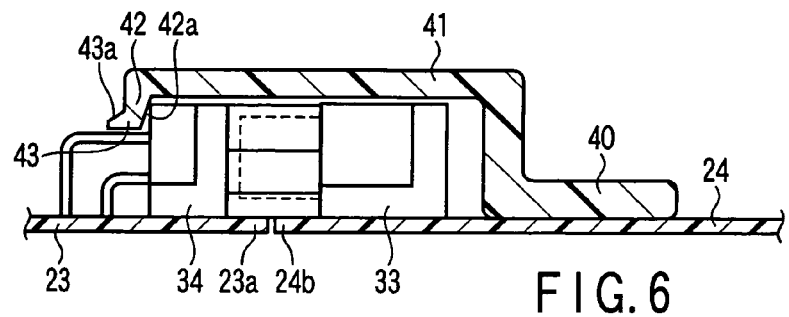
FIG. 6 is a sectional view of a state in which the connector of the daughter board shown in FIG. 3 has been inserted into the receptor of the extension board.

A holder 40 is fixed to the extension board 24 to prevent separation of the second receptor 33 from the connector 34. The holder 40 has a lock piece 41 and a hook 42. The lock piece 41 has flexibility, and shaped to overhang and cover the second connector 34 connected with the second receptor 33. The hook 42 is formed at the distal end of the lock piece 41 which winds around toward the behind of the second connector 34 as shown in FIGS. 2 and 6. The hook 42 engages with the corner opposite to the insertion side of the second connector 34, thereby preventing removal of the second connector 34 from the second receptor 33.

When the daughter board 23 and extension board 24 are placed on the same plane, and the second connector 34 is approached to the second receptor 33, an interference projection 43 that contacts the second connector 34 just before inserting into the second receptor 33, is formed at the distal end of the lock piece 41. In this embodiment, the interference projection 43 is formed in one body with the hook 42, and projected in the direction leaving the second receptor 33. The lock piece 41 has a tab 44 to release the engagement of the hook 42 with the second connector 34. The tab 44 extends from one side of the lock piece 41 to the width direction of the second connector 34.

The communication apparatus 1 shown in FIG. 1 is wired as LAN. In the LAN wiring, it is common to use a communication cable having an 8-core modular jack. Therefore, at least one socket 23*c* to connect the 8-core modular jack is provided along the front wall 11 at the front side edge 23*b* of the daughter board 23 facing to the front wall 11. According to the communication format, it is permitted to provide a 6-core modular jack or Amphenol multi-core connector instead of an 8-core modular jack.

Figure 5:
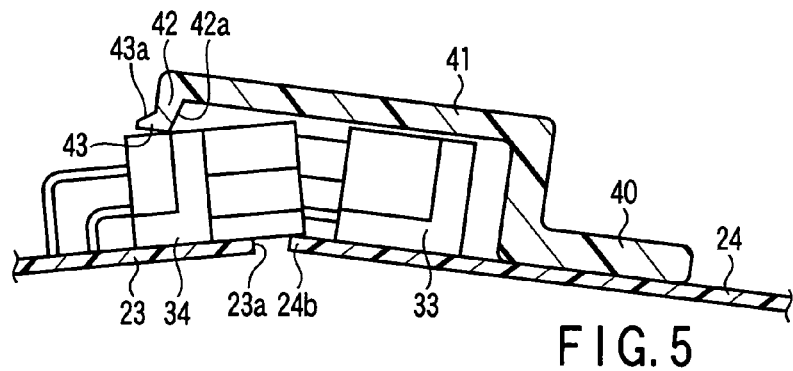
FIG. 5 is a sectional view of a state in which the connector of the daughter board shown in FIG. 3 is going to be inserted into the receptor of the extension board.
Figure 7:
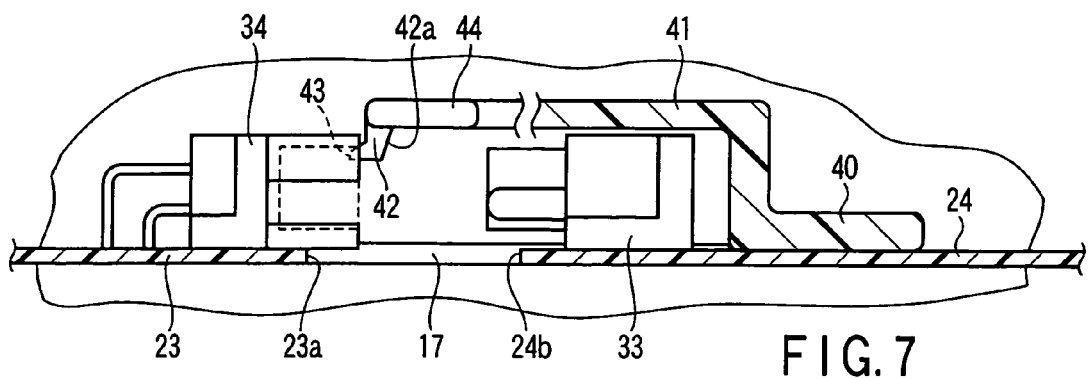
FIG. 7 is a sectional view of a state in which the connector of the daughter board shown in FIG. 3 is contacting the holder fit in the receptor of the extension board.

Next, explanation will be given on the function of the holder 40 configured as above. As the second connector 34 is interrupted by the interference projection 43 as shown in FIG. 7 even if it is approached to the second receptor 33 from the front side, the second connector 34 is blocked insertion to the second receptor 33. When connecting the second connector 34 to the second receptor 33, incline the daughter board 23 to the extension board 24 just like raising the hook 42 by the second connector as shown in FIG. 5.

The hook 42 has a contact surface 42*a* that is inclined toward the distal end in the direction leaving the second receptor 33. The lock piece 41 is flexible, and contacts the second connector 34 on the contact surface 42*a*. The second connector 34 is urged in the direction to be inserted into the second receptor 33 in the state connected to the receptor 33 shown in FIG. 6. Therefore, loose fitting of the second receptor 33 and second connector 34 is prevented even if there is a clearance for inserting in the inclined direction.

For the maintenance of the communication apparatus 1 or replacement of the daughter board 23, extract the daughter board 23 from the insertion space 16*b* to the front side, after removing the front wall 11 of the case 10. In this time, the daughter board 23 and extension board 24 are in the state connected by the holder 40 that connects the second receptor 33 and second connector 34. Hence, the first receptor 31 and first connector 32 are separated, and the daughter board 23 pulled out to the front with the extension board 24.

Particularly, the first receptor 31 is of a so-called hot-swap type receptor, which allows the control board 22 and daughter board 23 connecting to and being ejected from the motherboard 21 even while the motherboard 21 is being powered. The hot-swap type receptor is configured to connect a power supply terminal and ground terminal before a signal terminal when the connector is inserted.

While the first receptor 31 is placed to be connected the first connector 32 perpendicularly to the motherboard 21, the second receptor 33 is placed to be connected the second connector 34 in the direction along the extension board 24. Thus, it is difficult to use a hot-swap type receptor for the second receptor 33.

In the communication apparatus of this embodiment, the second receptor 33 and second connector 34 are coupled by the holder 40. Therefore, when only the daughter board 23 is held and pulled out from the insertion space 16*b*, the first receptor 31 and first connector 32 are disengaged while keeping engagement of the second receptor 33 and second connector 34. As a result, the electronic components mounted on the daughter board 23 are prevented from being damaged.

The interference projection 43 is formed at the distal end of the lock piece 41 of the holder 40. The interference projection 43 has a guide surface 43*a* that is inclined in the direction of coming close to the surfaces of the extension board 24 and daughter board 23 as it to leave the second receptor 33. Therefore, when the second receptor 33 and second connector 34 are urged in the direction of coming close to each other, the interference projection 43 sticks in the inlet of the second connector 34. Even if the daughter board 23 is inserted into the case 10 along the slot 17 after the extension board 24 has been inserted into the case 10 along the slot 17, as shown in FIG. 7, the second connector 34 is not accidentally connected to the non-hot-swap type second receptor 33 that is in the conducting state.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electrical apparatus comprising:
   a case which is configured to have an opening in a front wall;
   a motherboard which is positioned far behind the opening made in the case, with one surface faced to the opening;
   a daughter board which has been inserted into the case through the opening;
   a slot which is provided between the opening and motherboard, and guides the side edge of the daughter board extending in a inserting direction of the daughter board;
   an extension board which is placed between the motherboard and at least one daughter board;
   a first receptor which is mounted on the motherboard facing and opposed to the opening;
   a first connector which is provided at an insertion side of the extension board, is inserted in the first receptor and extends perpendicular to the one surface of the motherboard;
   a second receptor which is provided at an opening side of the extension board, with each terminal conducted to one terminal of the first connector;
   a second connector which is provided at an insertion side of the daughter board and is inserted in the second receptor; and
   a holder which is fixed to the extension board, has a flexible lock piece to cover the second connector connected to the second receptor, and has a hook to stop extracting the second connector from the second receptor at a distal end of the lock piece,
   wherein the holder has an interference projection at the distal end of the lock piece, said interference projection protrudes in a direction leaving the second receptor and sticks in the inlet of the second connector immediately before inserted into the second receptor when the daughter board approaches the extension board along the slot.

2. The electric apparatus according to claim 1, wherein the holder has a tab which releases the engagement with the second connector.

3. The electric apparatus according to claim 1, wherein the first receptor is of a hot-swap type which is allowed connection to and disconnection from the first connector while being powered, and the second receptor is of a non-hot-swap type which does not permit connection to and disconnection from the second connector while being powered.

4. A holder which prevents extracting a connector, which is mounted on a daughter board and connected to a receptor, from the receptor mounted on an extension board which is placed between a motherboard placed with one side faced to a front side in a case with a front wall opened, and the daughter board inserted through a slot provided between the opening and mother board,
   said holder comprises:
   a flexible lock piece which is fixed to the extension board, extends toward the daughter board, and covers the connector;
   a hook which is provided at a distal end of the lock piece and prevents the connector inserted in the receptor from extracting from the receptor;
   an interference projection at a distal end of the lock piece, said the interference projection protrudes in a direction leaving the second receptor and stick in the inlet of the connector before being inserted into the receptor, when the daughter board is approaching the extension board along the slot.

5. The holder according to claim 4, the receptor is of a non-hot-swap type which does not permit connection to and disconnection from the connector while being powered.

6. An electrical apparatus comprising:
   a case including an opening;
   a motherboard positioned behind the opening with one surface faced to the opening;
   a daughter board inserted into the case through the opening;
   a slot which is provided between the opening and motherboard, the slot guiding a side edge of the daughter board extending in an inserting direction of the daughter board;
   an extension board placed between the motherboard and at least one daughter board;
   a first receptor mounted on the motherboard facing and opposed to the opening;
   a first connector provided at an insertion side of the extension board, the first connector being inserted in the first receptor and extending perpendicular to the one surface of the motherboard;
   a second receptor provided at an opening side of the extension board;
   a second connector provided at an insertion side of the daughter board, the second connector being inserted in the second receptor; and
   a holder fixed to the extension board, the holder including (i) a flexible lock piece to cover the second connector coupled to the second receptor, and (ii) a hook to stop extracting the second connector from the second receptor at a distal end of the lock piece, the holder further including an interference projection at the distal end of the lock piece, said interference projection protrudes in a direction leaving the second receptor and inserts into an inlet of the second connector before inserted into the second receptor when the daughter board approaches the extension board along the slot.

* * * * *